United States Patent [19]

Chang

[11] Patent Number: 5,186,727
[45] Date of Patent: Feb. 16, 1993

[54] MIXED-METAL OXIDE ABSORBENT FOR CARBON DIOXIDE AND WATER REMOVAL

[75] Inventor: Chin-Hsiung Chang, Palatine, Ill.

[73] Assignee: Allied-Signal Inc., Moris Township, Morris County, N.J.

[21] Appl. No.: 712,223

[22] Filed: Jun. 7, 1991

[51] Int. Cl.$^5$ .............................................. B01D 53/04
[52] U.S. Cl. ............................................ 55/35; 55/68; 55/74; 55/387; 502/343; 502/400; 502/515
[58] Field of Search .................. 55/31, 33, 35, 68, 74, 55/387; 502/343, 345, 400, 515

[56] References Cited

U.S. PATENT DOCUMENTS

| | | | |
|---|---|---|---|
| 1,206,977 | 12/1916 | Batter | 55/33 |
| 2,698,305 | 12/1954 | Plank et al. | 55/74 X |
| 3,141,729 | 7/1964 | Clarke et al. | 55/35 X |
| 3,533,221 | 10/1970 | Tamura | 55/33 |
| 3,684,712 | 8/1972 | Bovard | 252/45 |
| 4,477,264 | 10/1984 | Kratz et al. | 55/33 X |
| 4,810,266 | 3/1989 | Zinnen et al. | 55/68 |

OTHER PUBLICATIONS

Fukunage et al., "Mixed-Gas Adsorption and Vacuum Desorption of Carbon Dioxide on Molecular Sieve", I&EC Proc. Design Devl., 7, pp. 269-275 (1968).

Dell-Osso et al., "Mixed-Gas Adsorption and Vacuum Desorption of Carbon Dioxide on Molecular Sieve", I&EC Proc. Design Devl., 8, pp. 469-482 (1969).

Colombo et al., "Regenerative Separation of Carbon Dioxide via Metallic Oxides" Chem. Engr. Progr. Sympos. Series, 62, pp. 89-94 (1966).

Barnes et al., "Reactivity of Silver Oxide in the Absorption of Carbon Dioxide", J. Chem. Soc. (A), pp. 3395-3398 (1971).

Ruth et al., "New Regenerable Sorbents for Fluidized Bed Coal Combustion", Environmental Sci. & Tech. vol. 13, No. 6, Jun. 1979, pp. 715-720.

Grindley et al., "Development and Testing of Regenerable Hot Coal Gas Desulfurization Sorbents", Oct. 1981.

Primary Examiner—Robert Spitzer
Attorney, Agent, or Firm—Mary Jo Boldingh; Harold N. Wells; Gerhard H. Fuchs

[57] ABSTRACT

Mixed-metal oxide absorbents having superior $CO_2$ and water removal capacity and superior regenerability are prepared from novel mixed-metal carbonate precursors or from mixed-metal oxides derived from those precursors. The precursors are prepared from a salt of silver and the salt of a second metal. The second metal may be selected from the group consisting of magnesium, iron, cobalt, nickel, zinc, and other metals for which the metal carbonate to metal oxide reaction occurs at a temperature of not greater than about 400° C. The precursors have an unique x-ray diffraction pattern characteristic of the silver carbonate pattern rather than of the physical mixture of the silver carbonate and the carbonate of the second metal.

33 Claims, 3 Drawing Sheets

STD. $Ag_2CO_3$ ABSORBENT VS. ABSORBENT A-2

$CO_2$ Breakthrough for $Ag_2CO_3$ and Mixed-Metal Oxide $Ag_2$:Zn = 5.4:5.0

STD. Ag$_2$CO$_3$ ABSORBENT VS. ABSORBENT A-3

5,186,727

MIXED-METAL OXIDE ABSORBENT FOR CARBON DIOXIDE AND WATER REMOVAL

BACKGROUND OF THE INVENTION

This invention relates generally to mixed-metal carbonate precursors, to the mixed-metal oxides prepared from those precursors, and to mixed-metal oxide absorbents prepared from either the precursors or the oxides. The absorbents provide a high capacity, regenerable system for the removal of both $CO_2$ and water from air. Such a dual function system provides advantages in numerous applications (e.g., enclosed environments such as space stations, extravehicular activities, under water missions) because it saves weight and space and simplifies operation (e.g., regeneration of only one rather than two units is necessary).

In the past, $CO_2$ has been removed from a gas by using zeolites, carbon molecular sieves, and lithium hydroxide. (See Fukunage et al., *I&EC Process Design Develop.*, 7, 269 (1968); Dell'Osso et al., *I&EC Process Design Develop.*, 8, 469 (1969); Dell'Osso et al., *I&EC Process Design Develop.*, 8, 477 (1969); Zinnen et al., U.S. Pat. No. 4,810,266; and Bovard, U.S. Pat. No. 3,684,712.) However, problems with low $CO_2$ capacity and poor regenerability have limited the use of these absorbents. Single component metal oxide absorbent systems have also been used in the past. (See Colombo et al., *Chem. Engr. Progr. Sympos. Series.* 62 (63), 89-94 (1966); Barnes et al., *J. Chem. Soc.* (A), 3395 (1971).) Other related systems include metal hydroxides, hindered amines and other amine solutions, glycine-activated $K_2CO_3$ solution, solid amines, supported $K_2CO_3$, and an electrochemical depolarized $CO_2$ concentrator system. These systems and those mentioned above are basically for the removal of $CO_2$ only; water is typically removed by a second system, either by a condensation method or with a dryer system.

SUMMARY OF THE INVENTION

Mixed-metal oxide absorbents having superior $CO_2$ and water removal capacity and superior regenerability are prepared from novel mixed-metal carbonate precursors or from mixed-metal oxides derived from those precursors. The absorbents may be used for the removal of both $CO_2$ and water from air and provide the advantages of weight and space savings and simplicity of operation. The mixed-metal carbonate precursors are prepared from a salt of silver and the salt of a second metal. The second metal may be selected from the group consisting of magnesium, iron, cobalt, nickel, zinc, and other metals which form both carbonates and oxides and for which the decarbonation process can be accomplished at less than 400° C. The silver-zinc mixed-metal carbonate precursors have an unique x-ray diffraction pattern characteristic of the silver carbonate pattern rather than of the physical mixture of the silver carbonate and the zinc carbonate.

BRIEF DESCRIPTION OF THE DRAWINGS

FIG. 1 shows results for the mixed-metal oxide absorbent with a $Ag_2$:Zn ratio of 5.8:4.0, FIG. 2 for the absorbent with a $Ag_2$:Zn ratio of 5.4:4.0, and FIG. 3 for the absorbent with a $Ag_2$:Zn: ratio of 4.4:6.0.

DESCRIPTION OF THE PREFERRED EMBODIMENTS

Figure 1:
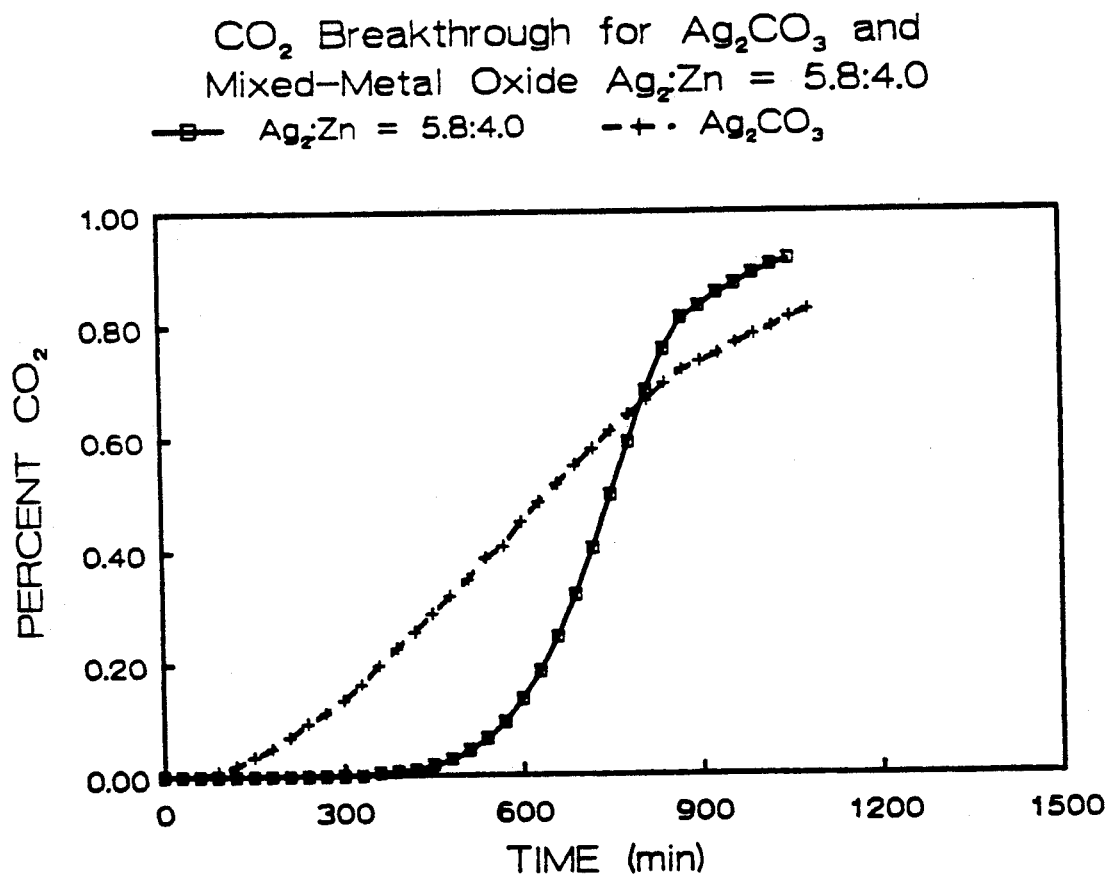
FIGS. 1-3 compare the $CO_2$ removal efficiency ("breakthrough") after regeneration of each of three absorbents prepared by the method of the instant invention to the $CO_2$ removal efficiency for the standard $Ag_2CO_3$ absorbent.

This invention relates generally to (1) mixed-metal carbonate precursors and their method of preparation, (2) mixed-metal oxides and their preparation from the precursors, (3) mixed-metal oxide absorbents prepared from either the precursors or the oxides, and (4) the use of the mixed-metal oxide absorbents for the removal of both $CO_2$ and water from air. The instant invention addresses the problem of providing a system with the dual function of removing both $CO_2$ and water from air. This dual function absorbent provides savings in weight and space which can be quite valuable in enclosed environment applications such as space stations, extravehicular activities in space, or under water. The absorbent also provides high absorption capacity and superior regenerability. Finally, the dual function absorbent has the benefit of simplicity of operation, e.g., only one unit is needed for regeneration.

In one embodiment of the instant invention, the mixed-metal carbonate precursor is prepared and activated to produce a mixed-metal oxide, and the resultant oxide is mixed with a binder and promoter and extruded to produce a mixed-metal oxide absorbent in extrudate form.

In another embodiment of the instant invention, the mixed-metal carbonate precursor itself is mixed with a binder and a promoter and the mixture is extruded and then activated to form the mixed-metal oxide absorbent.

Preparation of Mixed-Metal Carbonate Precursors

The mixed-metal carbonate precursors are prepared by intimately mixing a first solution comprising a salt of silver metal and a salt of a second metal with a second solution of equal concentration comprising a carbonate or bicarbonate compound. The second metal ("M") is chosen from the group consisting of magnesium, iron, cobalt, nickel, zinc, and other metals for which the metal carbonate to metal oxide reaction is sufficiently reversible. If the transformation from the carbonate to the oxide does not occur below a temperature of about 400° C., it is not likely to be sufficiently reversible for use in the mixed-metal oxide absorbent. The total metal salt concentration in the first solution will range from about 0.01 to 0.5 N, preferably about 0.1 N. The concentration of the carbonate or bicarbonate compound in the second solution will also fall within this same range. The resulting mixture of solutions is kept at a temperature of from about 0° to 10° C. for about 12 to 48 hours to prevent large crystallites from forming. Fine crystallites are subsequently recovered by vacuum filtration and dried in a vacuum oven. The atomic ratio of the two components in the first solution will be within the range of from about 0.1 to 10. This ratio controls the $Ag_2/M$ ratio in the resultant mixed-metal oxide.

Preparation of the Mixed-Metal Oxide

The mixed-metal oxide may be prepared by activating the mixed-metal carbonate precursor as described below in the Activation/Regeneration section.

Preparation of the Mixed-Metal Oxides Absorbent

The mixed-metal oxide absorbent is prepared either by mixing the mixed-metal carbonate precursor or the mixed-metal oxide with a binder and a promoter. The binder may be any binder which is known in the art as a binder for an extrudate. Examples of binders which may be used are inorganic binders such as sodium silicate, alumina, silica, and clay, and organic binders such as cellulose acetate, and polyethylene imine (PEI). The promoter can be any material which will promote $CO_2$ absorption on the mixed-metal oxide material. Examples of promoters are KOH, NaOH, $Mg(OH)_2$, and other hydroxides of alkali or alkaline earth metals. The mixture will contain about 3-25% by weight of binder and about 5-30% by weight of promoter with the balance being the precursor or oxide. Sufficient water is then added to the mixture so that it is consistent for extrusion. The mixture is extruded through a die of an appropriate diameter, the extrudate dried in air, and cut to a appropriate length. The extrudate is activated in humid air at 250° C. for about 2-5 hours at a pressure of about 101 kPa (1 atm), or until $CO_2$ concentration in the effluent air has decreased to less than 0.02 volume percent. After activation, the resultant absorbent is cooled to room temperature in humid air. Humid air is air with a relative humidity ranging from about 5 to about 85%.

Activation of the Mixed-Metal Carbonate Precursor and Regeneration of the Mixed-Metal Oxide Absorbent Activation of the mixed-metal carbonate precursor and activation or regeneration of the mixed-metal oxide absorbent is carried out in humid air at 200°-300° C. for about 2-5 hours at a pressure of from about 50 to 120 kPa or until the $CO_2$ concentration has decreased to less than 0.02 volume percent. After activation or regeneration treatment, the material is cooled to room temperature in humid air. Both activation and regeneration procedures increase the porosity of the material because of $CO_2$ escaping from the interior of the extrudate. The newly-prepared mixed-metal oxide absorbent will typically achieve a constant $CO_2/H_2O$ absorption performance and constant porosity after two absorption/regeneration cycles when prepared using the mixed-metal carbonate precursor and after about five cycles when prepared using the mixed metal oxide.

Removal of CO, and Water From Air Using Mixed-Metal Oxide Absorbents

The mixed-metal oxide absorbents may be used for $CO_2$ and $H_2O$ removal. Testing of the efficiency may be done in a breakthrough column. The absorbent may be packed in a column and a feed gas containing $CO_2$ and water passed up or down through the column.

EXAMPLE 1

Preparation of Mixed-Metal Carbonates

Silver-zinc mixed-metal carbonate precursors were prepared as follows. A first solution of 0.1 N $AgNO_3$ and $Zn(NO_3)_2$ was prepared for each sample with the $Ag_2/Zn$ ratio shown in Table I. The first solution was then intimately mixed with a second solution of 0.1 N sodium bicarbonate by spraying a fine Jet or mist of the each solution together to form a well-mixed solution. The resulting mixture was kept at 0° C. for 20 hours after which fine crystallites were recovered by vacuum filtration and dried in a vacuum oven. The mixed-metal carbonate precursors are labeled Samples C-1, C-2, and C-3. The $Ag_2/Zn$ atomic ratios of the carbonate samples were determined by atomic absorption and are listed in Table II. A comparison of Tables I and II illustrates that the metal ratio in the mixed-metal carbonate can be controlled by the metal ratio in the first solution.

TABLE I

Atomic Ratios of Metals in First Solution

| Sample # | $Ag_2/Zn$ |
| --- | --- |
| C-1 | 6/4 |
| C-2 | 5/5 |
| C-3 | 4/6 |

TABLE II

Elemental Analysis of Carbonate Samples

| Sample # | Ag (%) | Zn (%) | $Ag_2/Zn$ |
| --- | --- | --- | --- |
| C-1 | 59.7 | 12.4 | 5.8/4.0 |
| C-2 | 56.2 | 15.8 | 5.4/5.0 |
| C-3 | 49.0 | 20.2 | 4.4/6.0 |

EXAMPLE 2

Preparation of Single Component Silver Carbonate

Following the procedure described in Example 1, a standard silver carbonate sample was prepared by mixing a 0.1 N solution of $AgNO_3$ with a 0.1 N $NaHCO_3$ solution.

EXAMPLE 3

Thermal Gravimetric Analysis (TGA)

Each of the mixed-metal carbonate precursors (Samples C-1, C-2, and C-3) prepared in Example 1 was characterized by thermal gravimetric analysis (TGA) to determine its decarbonation behavior and thermal stability. The weight lost by each sample due to the evolution of $CO_2$ and $O_2$ was measured as the temperature was increased. The results, listed in Table III, show that the temperatures at which the maximum weight loss occurs for $CO_2$ and $O_2$ for all three mixed-metal carbonate samples of the instant invention differ from the temperatures seen for the individual carbonates, $Ag_2CO_3$ and $Zn_5(CO_3)_2 \cdot (OH)_6$. This indicates that the mixed-metal carbonates contain crystal phases different from a mixture of silver carbonate and zinc carbonate. If the absorbents were mixtures of silver and zinc carbonates, the $CO_2$ and $O_2$ evolutions would equal the calculated rather than the observed values shown in Table III. Also, the TGA results show that there is a window between the temperatures at which $CO_2$ and $O_2$ evolve. This window makes it possible to regenerate the mixed-metal oxide absorbent after $CO_2$ absorption without destroying the absorbent in the process.

TABLE III

|  | $Ag_2CO_3$ | C-1 | C-2 | C-3 | $Zn_5(CO_3)_2(OH)_6$ |
| --- | --- | --- | --- | --- | --- |
|  | $CO_2$ Evolution (wt. %) | | | | |
| Temp (°C.) | 222 | 241 | 250 | 234 | 280 |
| Observed | 15.48 | 15.32 | 17.76 | 17.69 | 25.7 |
| Calculated | 15.96 | 17.57 | 18.33 | 18.78 | 25.9* |
|  | $O_2$ Evolution (wt. %) | | | | |
| Temp (°C.) | 433 | 389 | 393 | 377 | — |
| Observed | 5.52 | 7.35 | 5.05 | 5.21 | — |
| Calculated | 5.80 | 4.43 | 4.17 | 3.63 | — |

*Based on $CO_2$ and $H_2O$ weight loss due to $Zn_5(CO_3)_2(OH)_6 \rightarrow 5ZnO + 2CO_2 + 3H_2O$

EXAMPLE 4

X-ray Powder Diffraction

The mixed-metal carbonate precursors, Samples C-1, C-2, and C-3, prepared in Example 1 were characterized by x-ray powder diffraction with CuKα radiation and compared with the pattern of the standard $Ag_2CO_2$ sample prepared in Example 2, the pattern of physical mixture of $Ag_2CO_3$ and $ZnCO_3$ (40 60 weight ratio), and the pattern of $Zn_5(CO_3)_2(OH)_6$. Results for Samples C-1, C-2, and C-3 appear in Tables IV—VI. A listing of the essential peaks of the absorbent appears in Table VII. The abbreviations vs, s, m, w, and vw in Table VII represent very strong, strong, medium, weak, and very weak. The d-spacings for the standard $Ag_2CO_3$ and $Zn_5(CO_3)_2(OH)_6$ samples appear in Tables IX and X and the uncertainty in the 2" values is about ±0.15°.

The peaks for the mixed-metal carbonate samples C-1, C-2, and C-3 clearly strongly resemble the $Ag_2CO_3$ peaks (Table IX; JCPDS—International Centre for Diffraction Data, file #26-339) and have little resemblance to the peaks for the $Ag_2CO_3/Zn_5(CO_3)_2(OH)_6$ physical mixture (Table VIII) or to the peaks for the $Zn_5(CO_3)_2(OH)_6$ compound (Table X; JCPDS—International Centre for Diffraction Data, file #19-1458). The difference in the relative intensities is likely due to experimental artifacts, e.g., preferred orientation, rather than to any difference in the crystal structure. For example, the peak with the maximum $I/I_o$ for Samples C-1 and C-2 is at 2Θ=33.8°, while for Sample C-3 it is at 2Θ=18.5°. In general, these results indicate that all three samples contain predominantly similar crystal structures that clearly resemble the crystal structure of $Ag_2CO_3$ in Table IX. Further, although zinc is present, there is no evidence of a separate zinc carbonate phase and the x-ray shows no amorphous phase.

TABLE IV

| | Sample C-1 | |
|---|---|---|
| 2Θ | d | $I/I_o$ |
| 18.438 | 4.80798 | 16.0 |
| 18.595 | 4.76785 | 39.4 |
| 20.557 | 4.31693 | 39.0 |
| 24.069 | 3.69436 | 0.8 |
| 26.223 | 3.39555 | 1.1 |
| 29.007 | 3.07568 | 2.2 |
| 32.638 | 2.74134 | 22.9 |
| 33.711 | 2.65655 | 100.0 |
| 35.064 | 2.55703 | 2.0 |
| 37.119 | 2.42007 | 28.7 |
| 37.732 | 2.38214 | 8.7 |
| 38.329 | 2.34641 | 6.0 |
| 38.784 | 2.31994 | 5.2 |
| 39.635 | 2.27204 | 14.6 |
| 41.810 | 2.15872 | 12.0 |
| 44.410 | 2.03819 | 3.7 |
| 47.132 | 1.92664 | 8.3 |
| 47.549 | 1.91070 | 1.6 |
| 48.573 | 1.87278 | 2.4 |
| 50.692 | 1.79938 | 1.3 |
| 51.459 | 1.77434 | 10.2 |
| 53.917 | 1.69910 | 1.7 |
| 54.673 | 1.67739 | 3.8 |
| 55.925 | 1.64275 | 2.4 |
| 56.102 | 1.63800 | 4.7 |
| 56.625 | 1.62410 | 1.3 |
| 57.018 | 1.61383 | 2.2 |
| 57.944* | 1.59024 | 8.8 |

*unresolved doublet

TABLE V

| | Sample C-2 | |
|---|---|---|
| 2Θ | d | $I/I_o$ |
| 13.020 | 6.79425 | 3.1 |
| 18.518 | 4.78728 | 16.5 |
| 18.618 | 4.76196 | 43.8 |
| 20.581 | 4.31203 | 35.7 |
| 26.230 | 3.30473 | 1.1 |
| 29.037 | 3.07263 | 1.7 |
| 32.661 | 2.73952 | 24.9 |
| 33.720 | 2.65580 | 100.0 |
| 35.064 | 2.55705 | 1.9 |
| 37.124 | 2.41976 | 19.7 |
| 37.736 | 2.38193 | 9.3 |
| 38.355 | 2.34486 | 5.5 |
| 38.784 | 2.31994 | 4.0 |
| 39.645 | 2.27147 | 13.3 |
| 41.835 | 2.15749 | 11.4 |
| 44.415 | 2.03756 | 3.6 |
| 47.158 | 1.92566 | 8.7 |
| 48.581 | 1.87252 | 1.8 |
| 50.698 | 1.79918 | 0.8 |
| 51.471 | 1.77396 | 10.8 |
| 53.943 | 1.69836 | 2.0 |
| 54.697 | 1.67671 | 3.5 |
| 56.094 | 1.63820 | 3.7 |
| 56.644 | 1.62359 | 1.3 |
| 57.035 | 1.61340 | 1.1 |
| 57.972* | 1.58952 | 9.4 |

*unresolved doubles

TABLE VI

| | Sample C-3 | |
|---|---|---|
| 2Θ | d | $I/I_o$ |
| 12.849 | 6.88412 | 2.5 |
| 18.594* | 4.76794 | 100.0 |
| 20.547 | 4.31909 | 28.6 |
| 26.188 | 3.40002 | 1.2 |
| 29.049 | 3.07141 | 1.9 |
| 29.270 | 3.04865 | 2.0 |
| 32.612 | 2.74352 | 19.0 |
| 33.679 | 2.65893 | 92.3 |
| 35.029 | 2.55952 | 1.4 |
| 37.103 | 2.42108 | 17.1 |
| 37.691 | 2.38463 | 19.9 |
| 38.323 | 2.34677 | 4.9 |
| 38.756 | 2.32156 | 3.9 |
| 39.606 | 2.27367 | 14.8 |
| 41.796 | 2.15943 | 9.8 |
| 44.387 | 2.03920 | 3.1 |
| 47.116 | 1.92725 | 8.1 |
| 47.532 | 1.91135 | 1.4 |
| 48.556 | 1.87340 | 1.4 |
| 50.686 | 1.79958 | 0.9 |
| 51.432 | 1.77520 | 12.9 |
| 53.864 | 1.70064 | 1.5 |
| 54.665 | 1.67761 | 3.5 |
| 55.857 | 1.64461 | 2.7 |
| 56.074 | 1.63875 | 3.4 |
| 56.996 | 1.61441 | 0.9 |
| 57.941* | 1.59030 | 21.7 |

*unresolved doublet

TABLE VII

| | Essential Absorbent Peaks | |
|---|---|---|
| 2Θ | d | $I/I_o$ |
| 18.33–18.63 | 4.76–4.84 | w |
| 18.46–18.76 | 4.73–4.80 | m–vs |
| 20.41–20.71 | 4.29–4.35 | m |
| 32.49–32.79 | 2.73–2.75 | w |
| 33.55–33.85 | 2.65–2.67 | vs |
| 36.96–37.26 | 2.41–2.43 | w–m |
| 37.56–37.86 | 2.37–2.39 | vw–w |
| 39.48–39.78 | 2.26–2.28 | w |
| 41.67–41.97 | 2.15–2.17 | w |
| 51.30–51.60 | 1.77–1.78 | w |

TABLE VII-continued

| | Essential Absorbent Peaks | |
|---|---|---|
| 2Θ | d | I/I$_o$ |
| 57.81–58.11 | 1.586–1.594 | vw–w |

TABLE VIII

| | Physical Mixture | |
|---|---|---|
| 2Θ | d | I/I$_o$ |
| 13.012 | 6.79797 | 37.6 |
| 18.384 | 4.82192 | 10.7 |
| 18.577 | 4.77222 | 26.0 |
| 20.541 | 4.32029 | 26.4 |
| 22.006 | 4.03587 | 3.9 |
| 24.155 | 3.68144 | 8.4 |
| 28.127 | 3.16992 | 14.3 |
| 28.425 | 3.13739 | 8.4 |
| 28.997 | 3.07674 | 8.0 |
| 30.326 | 2.94492 | 5.6 |
| 31.098 | 2.87349 | 14.8 |
| 32.648 | 2.74057 | 76.6 |
| 33.681 | 2.65880 | 100.0 |
| 34.964 | 2.56412 | 14.7 |
| 35.939 | 2.49680 | 18.8 |
| 36.326 | 2.47106 | 8.4 |
| 37.081 | 2.42247 | 19.2 |
| 37.753 | 2.38085 | 10.5 |
| 38.340 | 2.34574 | 6.6 |
| 38.763 | 2.32111 | 17.1 |
| 39.613 | 2.27324 | 35.5 |
| 41.784 | 2.16000 | 7.6 |
| 43.140 | 2.09524 | 1.7 |
| 44.391 | 2.03904 | 7.7 |
| 47.103 | 1.92777 | 10.3 |
| 47.497 | 1.91269 | 5.7 |
| 48.534 | 1.87423 | 3.6 |
| 50.705 | 1.79893 | 2.9 |
| 51.425 | 1.77542 | 13.1 |
| 53.895 | 1.69974 | 5.3 |
| 54.661 | 1.67773 | 10.5 |
| 55.829 | 1.64536 | 5.6 |
| 56.048 | 1.63945 | 9.3 |
| 57.958 | 1.58989 | 10.8 |
| 59.379 | 1.55518 | 7.2 |

TABLE IX

| | Ag$_2$CO$_3$ | |
|---|---|---|
| 2Θ | d | I/I$_o$ |
| 18.277 | 4.85000 | 15.00 |
| 18.547 | 4.78000 | 35.00 |
| 20.542 | 4.32000 | 30.00 |
| 26.110 | 3.41000 | 2.00 |
| 27.403 | 3.25200 | 3.00 |
| 28.985 | 3.07800 | 8.00 |
| 32.593 | 2.74500 | 60.00 |
| 33.665 | 2.66000 | 100.00 |
| 35.008 | 2.56100 | 6.00 |
| 37.072 | 2.42300 | 2.00 |
| 37.685 | 2.38500 | 11.00 |
| 37.751 | 2.38100 | 13.00 |
| 38.251 | 2.35100 | 8.00 |
| 38.748 | 2.32200 | 14.00 |
| 39.581 | 2.27500 | 35.00 |
| 41.764 | 2.16100 | 11.00 |
| 44.346 | 2.04100 | 10.00 |
| 45.886 | 1.97600 | 2.00 |
| 46.916 | 1.93500 | 6.00 |
| 47.071 | 1.92900 | 9.00 |
| 47.515 | 1.91200 | 4.00 |
| 48.512 | 1.87500 | 6.00 |
| 50.643 | 1.80100 | 3.00 |
| 51.376 | 1.77700 | 13.00 |
| 53.852 | 1.70100 | 3.00 |
| 54.651 | 1.67800 | 9.00 |
| 55.805 | 1.64600 | 6.00 |
| 56.065 | 1.63900 | 10.00 |
| 56.553 | 1.62600 | 6.00 |
| 56.935 | 1.61600 | 1.00 |

TABLE IX-continued

| | Ag$_2$CO$_3$ | |
|---|---|---|
| 2Θ | d | I/I$_o$ |
| 57.913 | 1.59100 | 9.00 |

TABLE X

| | Zn$_5$(CO$_3$)$_2$(OH)$_6$ | |
|---|---|---|
| 2Θ | d | I/I$_o$ |
| 13.066 | 6.77000 | 100.00 |
| 15.506 | 5.71000 | 5.00 |
| 16.494 | 5.37000 | 10.00 |
| 22.262 | 3.99000 | 20.00 |
| 23.328 | 3.81000 | 5.00 |
| 24.299 | 3.66000 | 40.00 |
| 26.426 | 3.37000 | 5.00 |
| 28.401 | 3.14000 | 50.00 |
| 29.756 | 3.00000 | 10.00 |
| 30.591 | 2.92000 | 20.00 |
| 31.361 | 2.85000 | 30.00 |
| 32.655 | 2.74000 | 10.00 |
| 32.902 | 2.72000 | 60.00 |
| 33.279 | 2.69000 | 20.00 |
| 34.742 | 2.58000 | 10.00 |
| 36.190 | 2.48000 | 70.00 |
| 37.538 | 2.39400 | 5.00 |
| 38.506 | 2.33600 | 10.00 |
| 39.116 | 2.30100 | 20.00 |
| 39.984 | 2.25300 | 5.00 |
| 40.739 | 2.21300 | 10.00 |
| 41.443 | 2.17700 | 5.00 |
| 43.340 | 2.08600 | 5.00 |
| 43.826 | 2.06400 | 10.00 |
| 44.346 | 2.04100 | 5.00 |
| 45.162 | 2.00600 | 5.00 |
| 46.686 | 1.94400 | 5.00 |
| 47.436 | 1.91500 | 30.00 |
| 47.780 | 1.90200 | 30.00 |
| 49.439 | 1.84200 | 10.00 |
| 50.255 | 1.81400 | 10.00 |
| 51.469 | 1.77400 | 20.00 |
| 52.389 | 1.74500 | 5.00 |
| 54.301 | 1.68800 | 40.00 |
| 55.403 | 1.65700 | 10.00 |
| 55.805 | 1.64600 | 5.00 |
| 57.205 | 1.60900 | 5.00 |
| 58.640 | 1.57300 | 20.00 |
| 59.219 | 1.55900 | 10.00 |
| 59.725 | 1.54700 | 5.00 |

EXAMPLE

Preparation of Mixed-Metal Oxide Absorbents

Mixed-metal oxide absorbents were prepared from each of the mixed-metal carbonate precursor samples prepared in Example 1. The precursor was mixed with a sodium silicate binder and a potassium hydroxide promoter. The mixture contained approximately 10% sodium silicate, 10% potassium hydroxide, and 80% precursor. Sufficient water was added to obtain a consistent mixture for extrusion and the mixture extruded through a 1.6 mm (1/16") die, dried in air, the cut to an appropriate length. The extrudate was activated at 250° C. for about 3 hours at a pressure of about 101 kPa (1 atm) during which time the CO$_2$ concentration decreased to less than 0.02 volume percent. After activation, the absorbent was cooled to room temperature in humid air. The three mixed-metal oxide absorbents prepared are labeled Samples A-1, A-2, A-3 (i.e., Sample A-1 is the absorbent prepared from carbonate sample C-1).

EXAMPLE 6

Preparation of Standard Silver Oxide Absorbent

A standard single component silver oxide absorbent was prepared as described in Example 5 using silver carbonate instead of the mixed-metal carbonate precursor.

EXAMPLE 7

Removal of $CO_2$ and Water From Air

Figure 2:
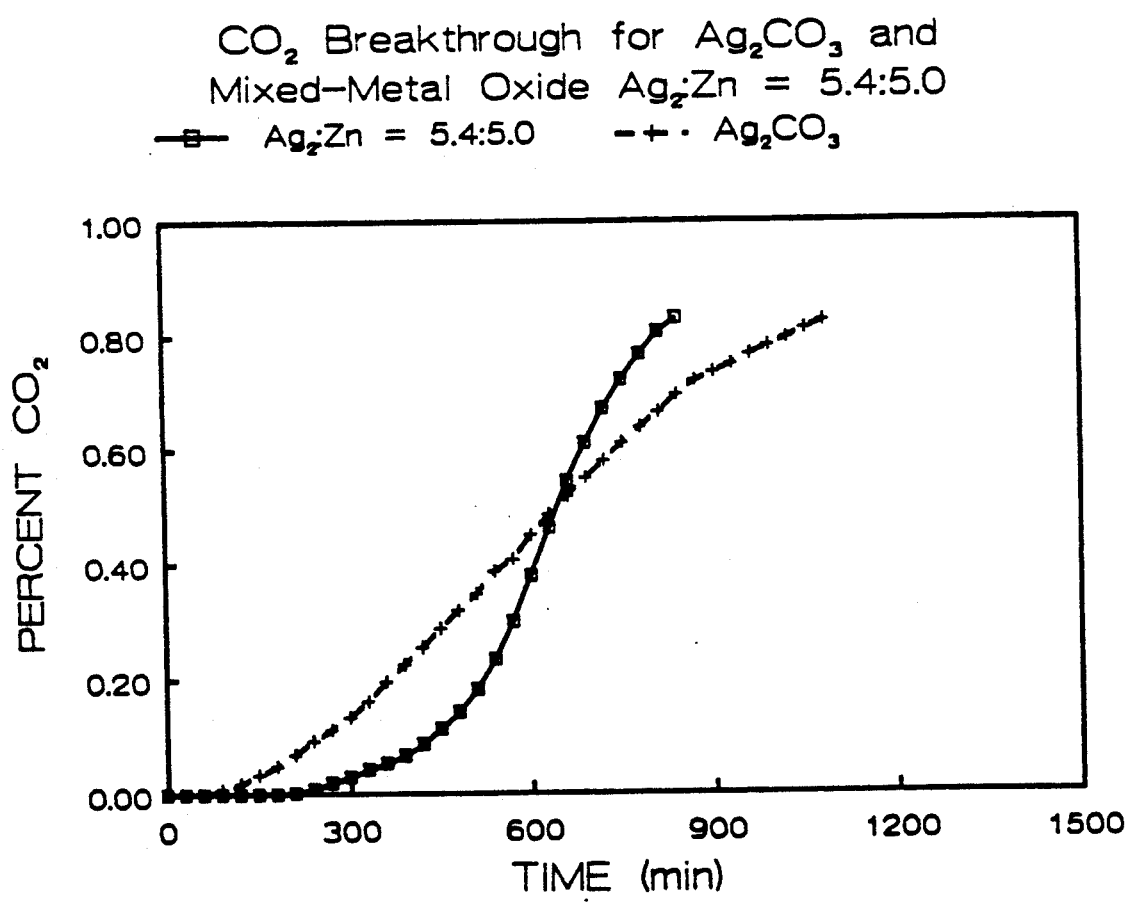
Figure 3:
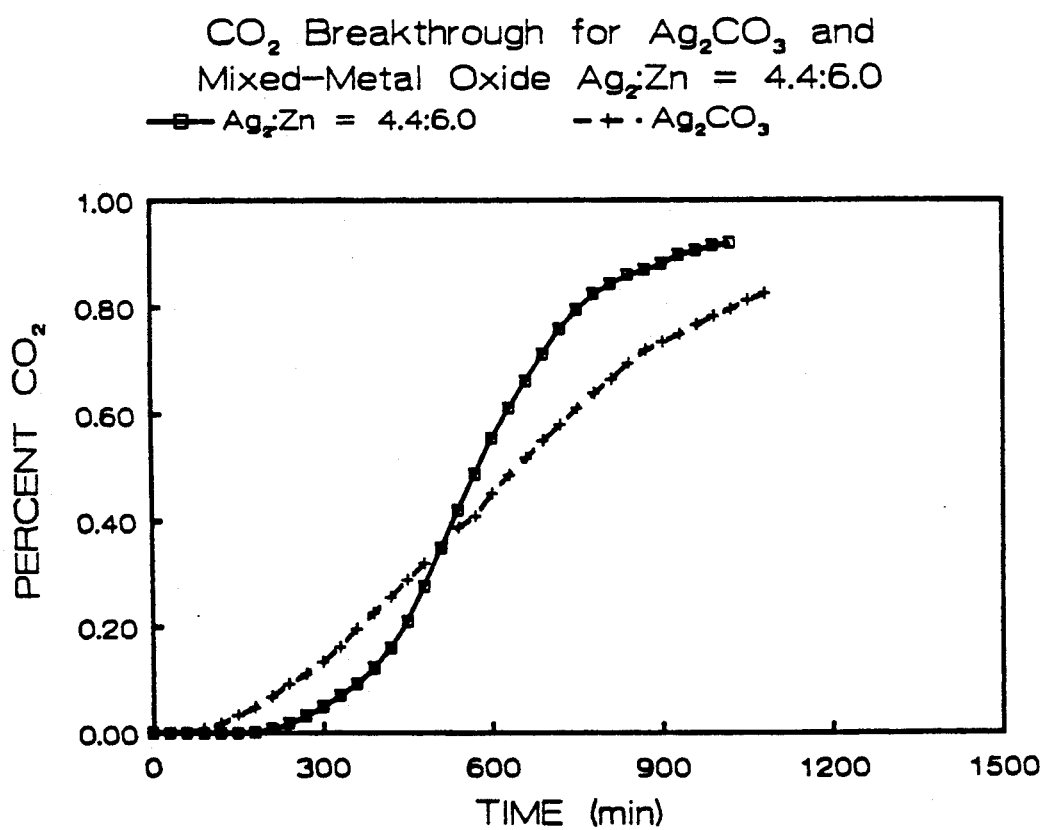

The $CO_2$ and $H_2O$ removal efficiency ("breakthrough") was tested twice for each of the absorbents prepared in Example 5 (A-1, A-2, and A-3) and for the standard silver oxide absorbent prepared in Example 6. The samples were exposed to a gas containing $CO_2$ and $H_2O$ in a "1st cycle," regenerated and then tested again in a "2nd cycle." Test results appear in FIGS. 1–3 for the second cycle and are summarized for both the first and second cycles in Table XI.

The tests were carried out as follows. About ten grams of each sample was tightly packed in a stainless steel column (inner diameter 1.4 cm). Before efficiency testing, the sample was activated by heating in a flow of humidified air (85% relative humidity) at about 110 mL/min at a temperature of 250° C. for a period of about 3 hours at 101 kPa (1 atm). When the $CO_2$ concentration decreased to less than 0.02 volume %, the sample was cooled in humid air to room temperature and the weight of the sample was measured. The sample was then tested for $CO_2$ and $HO_2$ removal efficiency (the "1st cycle" in Table XI) by introducing a humid feed gas containing 1% $CO_2$ flowing up through the column at 110 mL/min. The humidity of the feed was controlled by a water evaporator kept at room temperature and the removal of $CO_2$ from the feed gas was monitored by a $CO_2$ detector attached at the effluent side of the absorbent bed. When the effluent $CO_2$ concentration reached a value which was 80% of the feed concentration, the feed was stopped and the total weight gain of the absorbent was determined.

The amount of $CO_2$ removed from the gas was determined from the $CO_2$ concentration curves by integration and the amount of $H_2$ removed was determined by subtracting the weight of the $CO_2$ from the total weight gain of the sample. The sample was regenerated in humid air at 250° C. for about 3 hours at a pressure of about 101 kPa (1 atm). During the regeneration, the $CO_2$ concentration decreased to less than 0.02 volume percent. After regeneration, the sample was cooled to room temperature in humid air and the second removal efficiency test was run (the "2nd cycle" in Table XI).

The results in Table XI show that even during the 2nd cycle, the $CO_2$ capacity of the samples of the instant invention is superior to the capacity of the standard $Ag_2CO_3$ and, in addition, the $H_2O$ capacity of Sample A-1 is superior to that of the standard.

TABLE XI

Summary of $CO_2$ Breakthrough Tests on $Ag_2$/Zn Mixed-Metal Oxide Absorbents

| Sample # | A-1 | A-2 | A-3 | Std. $Ag_2CO_3$ |
|---|---|---|---|---|
| $Ag_2$/Zn Ratio | 5.8/4.0 | 5.4/5.0 | 4.4/6.0 | $Ag_2CO_3$ only |
| Total Wt. Tested (g) | 9.48 | 9.58 | 9.68 | 10.49 |
| Sample volume (mL) | 9.2 | 8.6 | 9.6 | 5.9 |
| $CO_2$ Capacity (% g/g) | | | | |
| 1st cycle | | | | |
| 0% of feed $CO_2$ conc. (baseline) | 4.9 | 2.5 | 2.5 | 1.9 |

TABLE XI-continued

Summary of $CO_2$ Breadkthrough Tests on $Ag_2$/Zn Mixed-Metal Oxide Absorbents

| Sample # | A-1 | A-2 | A-3 | Std. $Ag_2CO_3$ |
|---|---|---|---|---|
| 80% of feed $CO_2$ conc. 2nd cycle | 15.5 | 13.1 | 11.0 | 9.9 |
| 0% of feed $CO_2$ conc. (baseline) | 8.5 | 5.1 | 4.5 | 1.8 |
| 80% of feed $CO_2$ conc. $H_2O$ Absorbed (% g/g) | 16.5 | 14.6 | 15.0 | 12.9 |
| 1st cycle | 8.5 | 6.9 | 8.4 | 11.8 |
| 2nd cycle | 12.3 | 7.1 | 8.1 | 9.3 |

I claim:

1. A mixed-metal carbonate precursor comprising silver and zinc and having a characteristic x-ray powder diffraction pattern which contains at least the d-spacing set forth in Table VII.

2. The precursor of claim 1 wherein the second metal is zinc.

3. The precursor of claim 1 wherein the atomic ratio of $Ag_2$ to the second metal is about 0.1 to 10.

4. The precursor of claim 1 in which the ratio of $Ag_2$ to the second metal is controlled by the ratio of $Ag_2$ to the second metal in the first solution.

5. A mixed-metal oxide prepared by the process comprising the steps of:
   a) activating the mixed-metal carbonate precursor of claim 1 in air having a relative humidity ranging from 5 to 85%, at a temperature from about 200°–300° C., and at a pressure of about 50–101 kPa until the $CO_2$ concentration has decreased to less than about 0.02 volume percent; and
   b) cooling said activated precursor to room temperature in humid air to form said oxide.

6. A mixed-metal oxide absorbent prepared by the process comprising the steps of:
   a) mixing the mixed-metal oxide of claim 5 with a binder and promoter to form a mixture;
   b) adding sufficient water to said mixture to obtain a paste;
   c) extruding said paste to form an extrudate; and
   d) drying said extrudate in air to form said absorbent.

7. A process for preparing a mixed-metal oxide absorbent comprising the steps of:
   a) mixing the mixed-metal oxide of claim 5 with a binder and a promoter to form a mixture;
   b) adding sufficient water to said mixture to obtain a paste;
   c) extruding said paste to form an extrudate; and,
   d) drying said extrudate in air to form said absorbent.

8. A mixed-metal oxide absorbent prepared by the process comprising the steps of:
   a) mixing the mixed-metal carbonate precursor of claim 1 with a binder and a promoter to form a precursor mixture;
   b) adding sufficient water to said precursor mixture to obtain a precursor paste;
   c) extruding said precursor paste to form an extrudate;
   d) drying said extrudate in air;
   e) activating said dried extrudate in air having a relative humidity ranging from 5 to 85%, at a temperature from about 200°–300° C. at a pressure of from about 50–120 kPa until the $CO_2$ concentration decreases to less than about 0.02 volume percent; and, f) cooling said activated extrudate to room temperature in air having a relative humidity ranging from 5 to 85% to form said absorbent.

9. The absorbent of claim 8 wherein the second metal is zinc.

10. The absorbent of claim 8 wherein the binder comprises an inorganic compound selected from the group consisting of sodium silicate, alumina, silica, and clay, or an organic compound selected from the group consisting of cellulose acetate, and polyethylene imine.

11. The absorbent of claim 8 wherein the promoter comprises a material which will promote $CO_2$ absorption on the mixed-metal oxide absorbent.

12. The absorbent of claim 8 wherein the promoter comprises KOH, NaOH, $Mg(OH)_2$, and other hydroxides of alkali or alkaline earth metals.

13. The absorbent of claim 8 in which the mixture contains about 3-25% by weight of binder and about 5-30% by weight of promoter with the balance comprising the oxide or precursor.

14. A process for removing both carbon dioxide and water from air comprising passing a stream of air over the mixed-metal oxide absorbent of claim 8.

15. A process for preparing a mixed-metal oxide comprising the steps of:
   a) activating the mixed-metal carbonate precursor of claim 1 in air having a relative humidity ranging from 5 to 85%, at a temperature from about 200°-300° C., and at a pressure of about 50-101 kPa until the $CO_2$ concentration has decreased to less than about 0.02 volume percent; and
   b) cooling said activated precursor to room temperature in humid air.

16. A process for preparing a mixed-metal oxide absorbent comprising the steps of:
   a) mixing the mixed-metal carbonate precursor of claim 1 with a binder and a promoter to form a precursor mixture;
   b) adding sufficient water to said precursor mixture to obtain a precursor paste;
   c) extruding said precursor paste to form an extrudate;
   d) drying said extrudate in air;
   e) activating said dried extrudate in air having a relative humidity ranging from 5 to 85%, at a temperature from about 200°-300° C. at a pressure of from about 50-120 kPa until the $CO_2$ concentration decreases to less than about 0.02 volume percent; and,
   f) cooling said activated extrudate to room temperature in air having a relative humidity ranging from 5 to 85% to form said absorbent.

17. A mixed-metal carbonate precursor prepared by the process comprising the steps of:
   a) mixing a first solution comprising a salt of silver and a salt of a second metal with a second solution comprising a carbonate or bicarbonate compound, wherein the salt of the second metal is selected from the group consisting of magnesium, iron, cobalt, nickel, zinc, and other metals for which the metal carbonate to metal oxide reaction occurs at a temperature of not greater than about 400° C., and wherein both first and second solutions have concentrations of from about 0.01 to 0.5 N;
   b) storing the resultant mixture of solutions at a temperature of from about 0° to 10° C. for about 12 and 48 hours;
   c) recovering the fine crystallites from said mixture of solutions by vacuum filtration; and,
   d) drying said crystallites in a vacuum oven to produce said precursor.

18. The precursor of claim 17 wherein the second metal is zinc.

19. The precursor of claim 17 wherein the atomic ratio of $Ag_2$ to the second metal is about 0.1 to 10.

20. The precursor of claim 17 in which the ratio of $Ag_2$ to the second metal is controlled by the ratio of $Ag_2$ to the second metal in the first solution.

21. A mixed-metal oxide prepared by the process comprising the steps of:
   a) activating the mixed-metal carbonate precursor of claim 17 in air having a relative humidity ranging from 5 to 85%, at a temperature from about 200°-300° C., and at a pressure of about 50-101 kPa until the $CO_2$ concentration has decreased to less than about 0.02 volume percent; and
   b) cooling said activated precursor to room temperature in humid air to form said oxide.

22. The mixed-metal oxide of claim 21 wherein the second metal is zinc.

23. A mixed-metal oxide absorbent prepared by the process comprising the steps of:
   a) mixing the mixed-metal oxide of claim 21 with a binder and a promoter to form a mixture;
   b) adding sufficient water to said mixture to obtain a paste;
   c) extruding said paste to form an extrudate; and,
   d) drying said extrudate in air to form said absorbent.

24. A mixed-metal oxide absorbent prepared by the process comprising the steps of:
   a) mixing the mixed-metal carbonate precursor of claim 17 with a binder and a promoter to form a precursor mixture;
   b) adding sufficient water to said precursor mixture to obtain a precursor paste;
   c) extruding said precursor paste to form an extrudate;
   d) drying said extrudate in air;
   e) activating said dried extrudate in air having a relative humidity ranging from 5 to 85%, at a temperature from about 200°-300° C. at a pressure of from about 50-120 kPa until the $CO_2$ concentration decreases to less than about 0.02 volume percent; and,
   f) cooling said activated extrudate to room temperature in air having a relative humidity ranging from 5 to 85% to form said absorbent.

25. The absorbent of claim 24 the second metal is zinc.

26. The absorbent of claim 24 wherein the binder comprises an inorganic compound selected from the group consisting of sodium silicate, alumina, silica, and clay, or an organic compound selected from the group consisting of cellulose acetate, and polyethylene imine.

27. The absorbent of claim 24 wherein the promoter comprises a material which will promote $CO_2$ absorption on the mixed-metal oxide absorbent.

28. The absorbent of claim 24 wherein the promoter comprises KOH, NaOH, $Mg(OH)_2$, and other hydroxides of alkali or alkaline earth metals.

29. The absorbent of claim 24 in which the mixture contains about 3-25% by weight of binder and about 5-30% by weight of promoter with the balance comprising the oxide or precursor.

30. A process for removing both carbon dioxide and water from air comprising passing a stream of air over the mixed-metal oxide absorbent of claim 24.

31. A process for preparing a mixed-metal oxide comprising the steps of:
  a) activating the mixed-metal carbonate precursor of claim 17 in air having a relative humidity ranging from 5 to 85%, at a temperature from about 200°–300° C., and at a pressure of about 50–101 kPa until the $CO_2$ concentration has decreased to less than about 0.02 volume percent; and
  b) cooling said activated precursor to room temperature in humid air.

32. A process for preparing a mixed-metal oxide absorbent comprising the steps of:
  a) mixing the mixed-metal carbonate precursor of claim 17 with a binder and a promoter to form a precursor mixture;
  b) adding sufficient water to said precursor mixture to obtain a precursor paste;
  c) extruding said precursor paste to form an extrudate;
  d) drying said extrudate in air;
  e) activating said dried extrudate in air having a relative humidity ranging from 5 to 85%, at a temperature from about 200°–300° C. at a pressure of from about 50–120 kPa until the $CO_2$ concentration decreases to less than about 0.02 volume percent; and,
  f) cooling said activated extrudate to room temperature in air having a relative humidity ranging from 5 to 85% to form said absorbent.

33. A process for preparing a mixed-metal carbonate precursor comprising the steps of:
  a) mixing a first solution comprising a salt of silver and a salt of a second metal with a second solution comprising a carbonate or bicarbonate compound, wherein the salt of the second metal is selected from the group consisting of magnesium, iron, cobalt, nickel, zinc, and other metals for which the metal carbonate to metal oxide reaction occurs at a temperature of not greater than about 400° C., and wherein both first and second solutions have concentrations of from about 0.01 to 0.5 N;
  b) storing the resultant mixture of solutions at a temperature of from about 0° to 10° C. for about 12 and 48 hours;
  c) recovering the crystallites from said mixture of solutions by vacuum filtration; and,
  d) drying said crystallites in a vacuum oven to produce said precursor.

* * * * *

UNITED STATES PATENT AND TRADEMARK OFFICE
CERTIFICATE OF CORRECTION

PATENT NO. : 5,186,727                                    Page 1 of 2
DATED      : February 16, 1993
INVENTOR(S): Chin-Hsiung Chang It is certified that error appears in the above-identified patent and that said Letters Patent is hereby corrected as shown below:

On title page, item [73] "Moris Township" should read --Morris Township--
Column 3, line 59: "Jet" should read --jet--.
Column 4, line 44: "$Zn_5(CO_3)_2 \cdot (OH)_6$" should read --$Zn_5(CO_3)_2(OH)_6$--
Column 5, line 8: "$Ag_2CO_2$" should read --$Ag_2CO_3$--
Column 5, line 9: after "pattern of" insert --a--
Column 5, line 10: "40  60" should read --40:60--
Column 5, line 18: "2"" should read --2θ--
Column 6, Table V: First column, line 17: "44.415" should read --44.425--
         Table V: Second column, line 8: "3.30473" should read --3.39474--
Column 8, line 47: "EXAMPLE" should read --Example 5--
Column 10, line 18: "d-spacing" should read --d-spacings--
Column 10, line 22: "precursor of claim" should read --precursor of claim 1--
Column 11, line 67: delete "the"

UNITED STATES PATENT AND TRADEMARK OFFICE
CERTIFICATE OF CORRECTION

PATENT NO. : 5,186,727
DATED : February 16, 1993
INVENTOR(S) : Chin-Hsiung Chang It is certified that error appears in the above-identified patent and that said Letters Patent is hereby corrected as shown below:

```
Column 12, line 49: After "claim 24" insert --wherein--
Column 14, line 19: "for about 12 and" should read
                    --for about 12 to--
Column 14, line 21: "the" should read --fine--
```

Signed and Sealed this

Fourteenth Day of June, 1994

Attest:

BRUCE LEHMAN

Attesting Officer

Commissioner of Patents and Trademarks